US010080252B2

(12) United States Patent
Sonnleitner

(10) Patent No.: US 10,080,252 B2
(45) Date of Patent: Sep. 18, 2018

(54) SYNCHRONOUS RECORDING OF AUDIO USING WIRELESS DATA TRANSMISSION

(71) Applicant: MIKME GmbH, Vienna (AT)

(72) Inventor: Philipp Sonnleitner, Gleisdorf (AT)

(73) Assignee: MIKME GMBH, Vienna (AT)

( * ) Notice: Subject to any disclaimer, the term of this patent is extended or adjusted under 35 U.S.C. 154(b) by 0 days.

(21) Appl. No.: 15/519,088

(22) PCT Filed: Oct. 16, 2015

(86) PCT No.: PCT/EP2015/074006
§ 371 (c)(1),
(2) Date: Apr. 13, 2017

(87) PCT Pub. No.: WO2016/059211
PCT Pub. Date: Apr. 21, 2016

(65) Prior Publication Data
US 2017/0231027 A1 Aug. 10, 2017

(30) Foreign Application Priority Data

Oct. 17, 2014 (DE) .................. 10 2014 115 148

(51) Int. Cl.
H04W 56/00 (2009.01)
H04W 76/15 (2018.01)
(Continued)

(52) U.S. Cl.
CPC .......... H04W 76/15 (2018.02); G10H 1/0058 (2013.01); G11B 27/031 (2013.01);
(Continued)

(58) Field of Classification Search
CPC .......... G10H 1/0058; G10H 2240/171; G10H 2240/175; G10H 2240/325
See application file for complete search history.

(56) References Cited

U.S. PATENT DOCUMENTS 8,301,790 B2 * 10/2012 Morrison ............. G10H 1/0058
709/203
8,826,355 B2 * 9/2014 DeLorme, Sr. .... H04N 7/17327
725/109
(Continued)

FOREIGN PATENT DOCUMENTS

JP 2005128296 A * 5/2005 ............ G10H 1/00

OTHER PUBLICATIONS

International Search Report for International Application No. PCT/EP2015/074006, dated Jan. 14, 2016, 6pp.
(Continued)

Primary Examiner — Devan Sandiford
(74) Attorney, Agent, or Firm — Lewis Roca Rothgerber Christie LLP

(57) ABSTRACT

A method of synchronous recording of audio is described. The described method comprises: (a) establishing a first wireless data transmission connection between a master device and a first recording device, (b) establishing a second wireless data transmission connection between the master device and a second recording device, (c) determining a first data transmission delay for the first data transmission connection, (d) determining a second data transmission delay for the second data transmission connection, (e) transmitting predetermined reference data from the master device to the first recording device and to the second audio recording device, (f) at the first recording device: playing back the predetermined reference data and recording first recording data, and (g) at the second recording device: playing back the predetermined reference data and recording second recording data, (h) wherein during the transmission of the predetermined reference data a difference between the first data transmission delay and the second data transmission delay is taken into account in such a manner that the playing back of the predetermined reference data takes place syn- (Continued)

chronously at the first recording device and at the second recording device. Furthermore, a system for synchronously recording audio is described.

14 Claims, 2 Drawing Sheets

(51) Int. Cl.
  *G10H 1/00* (2006.01)
  *G11B 27/031* (2006.01)
(52) U.S. Cl.
  CPC .... *H04W 56/002* (2013.01); *G10H 2240/211* (2013.01); *G10H 2240/325* (2013.01)

(56) References Cited

U.S. PATENT DOCUMENTS

| | | | |
|---|---|---|---|
| 2003/0164084 A1 | 9/2003 | Redmann et al. | |
| 2004/0025670 A1* | 2/2004 | Nagashima | G10H 1/0058 84/610 |
| 2005/0160270 A1* | 7/2005 | Goldberg | G10H 1/0025 713/176 |
| 2007/0133810 A1* | 6/2007 | Kishi | H04S 7/301 381/17 |
| 2007/0140510 A1 | 6/2007 | Redmann | |
| 2009/0113022 A1* | 4/2009 | Quoc | G06Q 10/10 709/218 |
| 2012/0160080 A1* | 6/2012 | Miwa | G10H 1/0016 84/623 |
| 2015/0256613 A1* | 9/2015 | Walker | H04L 67/32 709/217 |

OTHER PUBLICATIONS

Written Opinion for International Application No. PCT/EP2015/074006, dated Jan. 14, 2016, 7pp.
"Metronome touch—IPad Apps & Games on Brothersoft.com"; May 31, 2014; XP055238930; 3pp.

* cited by examiner

SYNCHRONOUS RECORDING OF AUDIO USING WIRELESS DATA TRANSMISSION

CROSS REFERENCE TO RELATED APPLICATION(S)

This application is a National Phase Patent Application of International Patent Application No. PCT/EP2015/074006, filed Oct. 16, 2015 which claims priority of German Patent Application No. 10 2014 115 148.8, filed Oct. 17, 2014, the disclosures of which are hereby incorporated herein by reference.

FIELD OF THE INVENTION

Embodiments of the invention relate to the field of synchronous recording of audio, in particular to a method and a system for synchronous recording of audio using wireless data transmission.

TECHNOLOGICAL BACKGROUND

When audio is simultaneously recorded with multiple recording devices (microphones), for example by two or more musicians or singers each using one recording device, it is customary that each musician or singer hears a common reference (for example a metronome or a previously recorded sound track) in his or her headphones and plays or sings relative to this reference. The individual recordings can then be transferred to a master device and joined together there in order to create the final recording.

It would be practical for several reasons, if the connection between each single recording device and the master device could be wireless. This would for example allow for high flexibility with regard to positioning of the recording devices. However, since most techniques for wireless data transmission (such as Bluetooth) exhibit latency, which can lead to different delays in the data transmission for each single connection, it is difficult to achieve the necessary synchronization of the recording devices. Even small temporal displacements in the range of milliseconds will make it almost impossible for musicians and singers to create a successful recording. Furthermore, wireless connections also involve the risk that the connection is interrupted, which may lead to loss of data.

SUMMARY

There may be a need for improved techniques for recording audio with wireless data transmission.

This need may be met by the exemplary embodiments set forth in the independent claims. Further advantageous exemplary embodiments of the present invention are set forth in the dependent claims.

According to a first aspect of the invention, a method of synchronous recording of audio is described. The described the method comprises the following: (a) establishing a first wireless data transmission connection between a master device and a first recording device, (b) establishing a second wireless data transmission connection between the master device and a second recording device, (c) determining a first data transmission delay for the first data transmission connection, (d) determining a second data transmission delay for the second data transmission connection, (e) transmitting predetermined reference data from the master device to the first recording device and to the second audio recording device, (f) at the first recording device: playing back the predetermined reference data and recording first recording data, and (g) at the second recording device: playing back the predetermined reference data and recording second recording data, (h) wherein during the transmission of the predetermined reference data a difference between the first data transmission delay and the second data transmission delay is taken into account in such a manner that the playing back of the predetermined reference data takes place synchronously at the first recording device and at the second recording device.

The described method is based on the insight that the first transmission delay (for the first wireless data transmission connection) and the second transmission delay (for the second wireless data transmission connection) can be determined and that synchronous play back of the predetermined reference data at both (the first and second) recording devices can be achieved by taking the difference between the determined transmission delays into account. With this method simple and reasonably priced recording devices can be made to synchronously play back predetermined reference data, so that multiple musicians or singers can simultaneously record their respective contributions to a recording.

In the present document, the term "predetermined reference data" in particular denotes data, which constitutes a suitable reference signal, such as for example a metronome signal, which, when it is played back (for example through headphones), allows a musician or singer to record his or her contribution at the right time and in the prescribed tempo.

The exemplary method begins with establishing the first wireless data transmission connection between the master device and the first recording device and establishing the second wireless data transmission connection between the master device and the second recording device. The wireless data transmission connections may in particular be Bluetooth connections. Then, the data transmission delay is determined for each data transmission connection. In other words, it is determined how long a data transmission between the master device and the (first and second) recording device takes. After the wireless connections have been established and the corresponding data transmission delays have been determined, the predetermined reference data is transmitted from the master device to both the first recording device and the second recording device. The predetermined reference data is then played back synchronously by each recording device while each recording device records corresponding recording data. The playing back of the reference data may for example take place through headphones or through a monitor loudspeaker, which is possibly arranged in such a manner that the played back reference audio signal does not influence the recording in a disturbing manner. The synchronous play back of the reference data is achieved by taking the data transmission delays into consideration. Thus, both recording devices can simultaneously make individual recordings which are synchronized with the predetermined reference data.

According to an exemplary embodiment of the invention, the master device initiates the transmission of the predetermined reference data to the first recording device at a first point in time and initiates the transmission of the predetermined reference data to the second recording device at a second point in time, wherein the temporal difference between the first point in time and the second point in time is equal to the difference between the first data transmission delay and the second data transmission delay.

In this exemplary embodiment, the difference between the first data transmission delay and the second data transmission delay is used to temporally displace the transmission of the predetermined reference data to the first and second recording devices, so that the predetermined reference data arrives simultaneously at the two recording devices, such that it can also be simultaneously (synchronously) played back.

This exemplary embodiment in particular has the advantage that the recording devices do not have to contribute to achieving the synchronization, since the master device takes care of the synchronization.

According to a further exemplary embodiment of the invention, the master device transmits a first offset value together with the predetermined reference data to the first recording device and transmits a second offset value together with the predetermined reference data to the second recording device, wherein the first recording device delays the playing back of the predetermined reference data in accordance with the first offset value, wherein the second recording device delays the playing back of the predetermined reference data in accordance with the second offset value, and wherein a difference between the first offset value and the second offset value is equal to the difference between the first data transmission delay and the second data transmission delay.

In this exemplary embodiment, the difference between the first data transmission delay and the second data transmission delay is used to calculate an offset value for each recording device and to transmit the offset value to the corresponding recording device together with the predetermined reference data. Each recording device then delays the play back of the received predetermined reference data in accordance with the received offset value. In this way, the predetermined reference data is played back simultaneously at both recording devices.

According to a further exemplary embodiment of the invention, the first recording data is stored in a storage or memory of the first recording device, and/or the second recording data is stored in a storage or memory of the second recording device.

The recording data may for example be stored as digital audio data with high resolution (e.g. 24 bit, 96 kHz) on an SD card in the recording device. Alternatively, the recording data may also be stored in a suitable compressed data format (e.g. AAC, MP3, MP4, etc.). The recording data may also be simultaneously stored both with high resolution and compressed.

According to a further exemplary embodiment of the invention, the method further comprises the following: (a) transmitting the first recording data from the first recording device to the master device, and/or (b) transmitting the second recording data from the second recording device to the master device. By transmitting the respective recording data to the master device, the master device may join the recording data together in order to create the complete recording.

According to a further exemplary embodiment of the invention, the transmitting the first and/or second recording data takes place continuously.

In this exemplary embodiment, the recording data is basically streamed without interruption. Should one of the data transmission connections fall out, the missing data can be read out from the storage of the corresponding recording device later and streamed again, in order to be joined together with the already transmitted recording data.

According to a further exemplary embodiment of the invention, the transmitting the first and/or second recording data takes place in a time-divided manner.

In this exemplary embodiment, the recording data is transmitted in packages having fixed or varying sizes. The transmission may take place in a regular manner, i.e. with a fixed temporal distance, or a non-regular manner. In the latter case, the recording data, which is stored (cached) in the storage of the recording device, may also not be transmitted until after completion of the entire recording procedure.

According to a further exemplary embodiment of the invention, the determining the first data transmission delay comprises the following: (a) transmitting a first reference signal from the master device to the first recording device, (b) receiving a first response signal from the first recording device at the master device, and (c) determining the first data transmission delay based on a first period of time from transmitting the first reference signal until receiving the first response signal, and/or the determining the second data transmission delay comprises the following: (d) transmitting a second reference signal from the master device to the second recording device, (e) receiving a second response signal from the second recording device at the master device, and (f) determining the second data transmission delay based on a second period of time from transmitting the second reference signal until receiving the second response signal.

In other words, the master device determines the respective data transmission delay by determining the period of time between transmitting a reference signal and receiving a corresponding response signal from the recording device.

According to a further exemplary embodiment of the invention, the first reference signal is a first digital signal that is transmitted over the first data transmission connection, and/or the second reference signal is a second digital signal that is transmitted over the second data transmission connection.

In this exemplary embodiment, both the digital reference signal as well as the corresponding response signal are transmitted over the wireless data transmission connection. Accordingly, the data transmission delay may substantially be determined as half of the measured period of time. The necessary processing time at the recording device may possibly also be taken into account.

According to a further exemplary embodiment of the invention, the first reference signal is a first acoustic signal, which is emitted by a loudspeaker of the master device, and the first response signal comprises a recording of the first acoustic signal, and/or the second reference signal is a second acoustic signal, which is emitted by the loudspeaker of the master device, and the second response signal comprises a recording of the second acoustic signal.

In this exemplary embodiment, only the response signal is transmitted over the wireless data transmission connection. Accordingly, the data transmission delay may substantially be determined as the measured period of time. The necessary processing time at the recording device may possibly also be taken into account.

According to a second aspect of the invention, a system for synchronously recording audio is described. The described system comprises (a) a first recording device, (b) a second recording device, and (c) a master device, wherein the first recording device, the second recording device and the master device are configured to perform the method according to the first aspect or any one of the above exemplary embodiments.

Each recording device in particular comprises a microphone unit for recording audio data, a playback unit (for example a headphone output and/or a loudspeaker) for playing back audio data, a data storage, a data transmission unit for wireless data communication, and a control unit.

The master device in particular comprises a control unit, a data storage and a data transmission unit for wireless data communication. The master device may in particular be implemented as a digital device (for example a smart phone, a tablet or a PC) with an application (app) installed thereon.

Although two recording devices have been consistently described in the aspects and exemplary embodiments described above, it should be clear to a skilled person that the invention may readily be extended to more than two recording devices. This merely requires that the data transmission delay for each additional recording device is determined and taken into account in the same manner, such that the playing back of the predetermined reference data takes place synchronously at all recording devices.

DETAILED DESCRIPTION OF EXEMPLARY EMBODIMENTS

Figure 1:
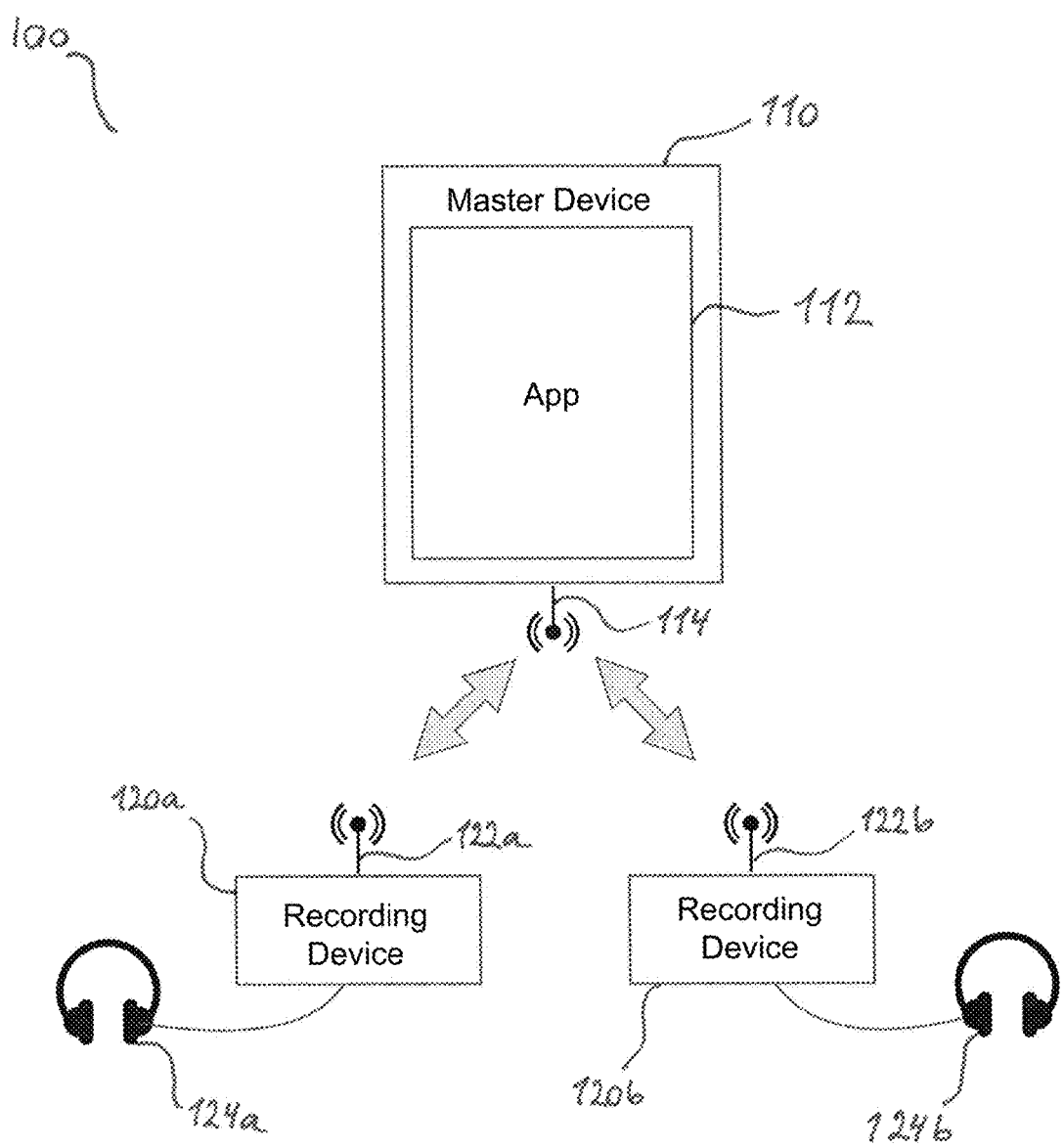
FIG. 1 shows a system according to an exemplary embodiment.

FIG. 1 shows a system 100 for synchronously recording audio in accordance with an exemplary embodiment. The system 100 comprises a master device 110, a first recording device 120a, and a second recording device 120b. The master device 110 is a digital device (for example a smart phone with an iOS or Android operating system), on which an application (app) 112 is installed. The application 112 is configured to perform the functionality described further below. The master device further comprises an antenna 114 for wireless data communication by means of Bluetooth.

Each of the two recording devices 120a, 120b comprises an antenna 122a, 122b for wireless data communication with the master device 110 (via antenna 114) and a connection port for headphones 124a, 124b for playing back audio to a user. Although FIG. 1 only shows two recording devices 120a, 120b, the system may comprise any desired number of recording devices.

Figure 2:
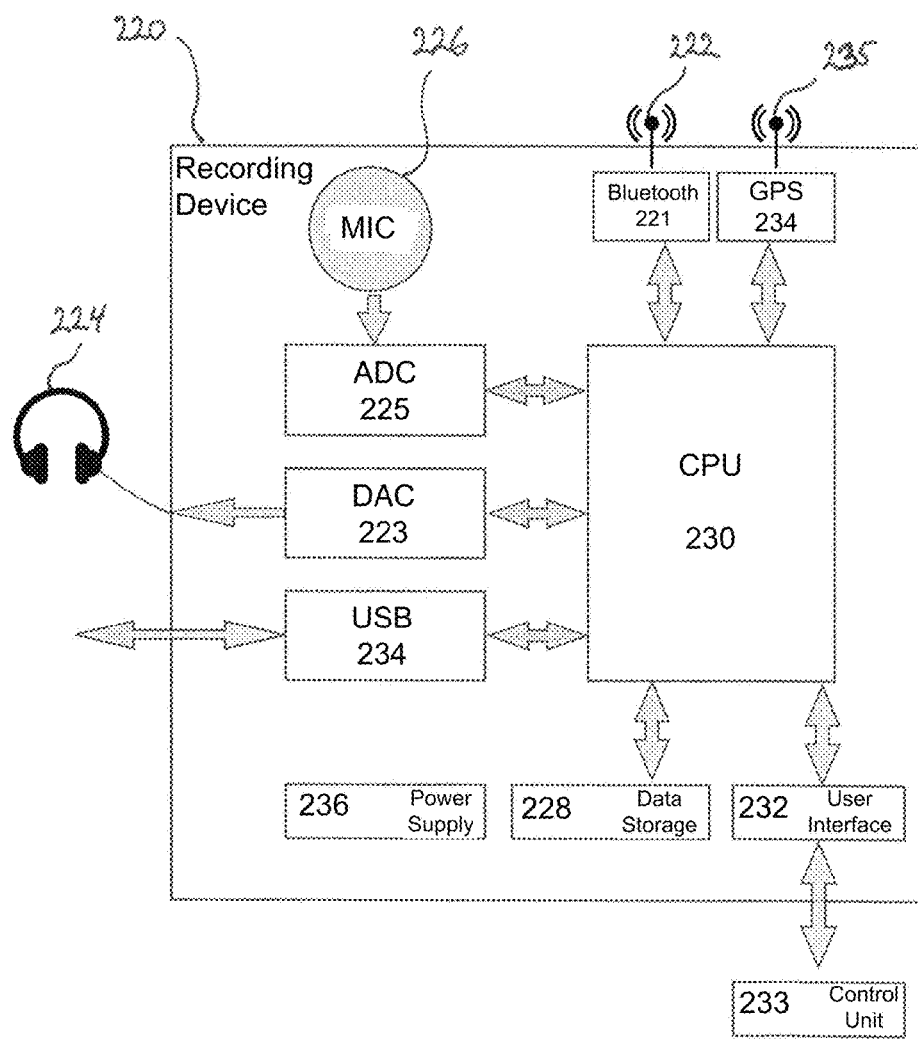
FIG. 2 shows a recording device of the system shown in FIG. 1.

FIG. 2 shows a detailed overview of a recording device 220 of the system 100 shown in FIG. 1. The shown recording device 220 thus essentially corresponds to each of the recording devices 120a, 120b shown in FIG. 1.

The recording device 220 comprises a central processing unit (processor) 230, which is communicatively connected to a Bluetooth transceiver 221, a GPS receiver 234, an analog to digital converter (ADC) 225, a digital to analog converter (DAC) 223, a USB interface 234, a data storage 228, and a user interface 232. The Bluetooth transceiver 221 is connected to an antenna 222 and the GPS receiver 234 is connected to an antenna 235. The GPS receiver 234 enables that GPS data (such as position, date and time) is stored as metadata in or together with recording data. The ADC 225 is connected to microphone unit 226 for audio recording. The DAC 223 is connected to a connection port for a set of headphones 224. The user interface 232 is connected to control unit 233, which comprises push buttons and LEDs. The recording device 220 also further comprises a power supply unit 236, which supplies electrical energy to the aforementioned components.

With reference to FIG. 1 as well as to FIG. 2, a method of synchronous recording of audio in accordance with an exemplary embodiment of the invention will now be described. First of all, wireless data transmission connections are established between the master device 110 and each of the recording devices 120a, 120b. Then, a data transmission delay is determined for each data transmission connection. This may for example take place in such a manner that the master device 110 transmits a reference signal (either via the corresponding wireless data communication connection or as an acoustic signal) and then measures the period of time until receiving a corresponding response signal from the relevant recording device 120a, 120b. Next, predetermined reference data is transmitted from the master device to the first recording device 120a and to the second recording device 120b (using the respective wireless data transmission connection). After receipt of this predetermined reference data, a corresponding reference audio signal (for example a metronome signal, a click track, or a previously recorded reference signal) is played back synchronously both at the first recording device 120a and at the second recording device 120b. In order to enable the synchronous play back of the reference audio signal, the determined data transmission delays, in particular a difference between the first data transmission delay and the second data transmission delay, are taken into consideration. While the reference audio signal is played back, both recording devices record recording data (through microphone unit 226) and stores it in data storage 228, if applicable together with meta data based on GPS data from the GPS receiver 234. The recording data may also be transmitted to the master device over the respective wireless data transmission connection. Alternatively, or additionally, the recording data may be read out over USB interface 234. Begin and end of the respective recording may be set by a user operating the control unit 233.

The mentioned synchronization may be achieved based on the determined data transmission delays in various ways. A first possibility is that the transmission of the predetermined reference data to each single recording device takes place in a time-displaced manner, wherein the temporal distance between the times of transmission is equal to the difference between the data transmission delays.

A further possibility is that an individual offset value is transmitted to each recording device together with the predetermined reference data. The offset values are chosen in such a manner that the difference between the offset values is equal to the difference between the data transmission delays. Each single recording device then delays the play back of the predetermined reference data based on the received offset value, such that also in this case the play back of the reference data takes place synchronously.

The invention claimed is:

1. A method of synchronous recording of audio, the method comprising:
    establishing a first wireless data transmission connection between a master device and a first recording device,
    establishing a second wireless data transmission connection between the master device and a second recording device,
    determining a first data transmission delay for the first data transmission connection,
    determining a second data transmission delay for the second data transmission connection,
    transmitting predetermined reference data from the master device to the first recording device and to the second audio recording device, at the first recording device: playing back the predetermined reference data and recording first recording data, and at the second recording device: playing back the predetermined reference data and recording second recording data, wherein during the transmission of the predetermined reference data a difference between the first data transmission delay and the second data transmission delay is taken into account in such a manner that the playing back of the predetermined reference data takes place synchronously at the first recording device and at the second recording device.

2. The method according to claim 1, wherein the master device initiates the transmission of the predetermined reference data to the first recording device at a first point in time and initiates the transmission of the predetermined reference data to the second recording device at a second point in time, wherein the temporal difference between the first point in time and the second point in time is equal to the difference between the first data transmission delay and the second data transmission delay.

3. The method according to claim 1, wherein the master device transmits a first offset value together with the predetermined reference data to the first recording device and transmits a second offset value together with the predetermined reference data to the second recording device, wherein the first recording device delays the playing back of the predetermined reference data in accordance with the first offset value, wherein the second recording device delays the playing back of the predetermined reference data in accordance with the second offset value, and wherein a difference between the first offset value and the second offset value is equal to the difference between the first data transmission delay and the second data transmission delay.

4. The method according to claim 1, further comprising at least one of the following features:
the first recording data is stored in a storage of the first recording device, and
the second recording data is stored in a storage of the second recording device.

5. The method according to claim 1, further comprising at least one of:
transmitting the first recording data from the first recording device to the master device, and
transmitting the second recording data from the second recording device to the master device.

6. The method according claim 5, wherein transmitting at least one of the first and second recording data takes place continuously.

7. The method according to claim 5, wherein transmitting at least one of the first and second recording data takes place in a time-divided manner.

8. The method according to claim 1, wherein determining the first data transmission delay comprises the following:
transmitting a first reference signal from the master device to the first recording device,
receiving a first response signal from the first recording device at the master device, and
determining the first data transmission delay based on a first period of time from transmitting the first reference signal until receiving the first response signal.

9. The method according to claim 8, wherein the first reference signal is a first digital signal that is transmitted over the first data transmission connection.

10. The method according to claim 8, wherein the first reference signal is a first acoustic signal, which is emitted by a loudspeaker of the master device, and the first response signal comprises a recording of the first acoustic signal.

11. The method according to claim 1, wherein determining the second data transmission delay comprises the following:
transmitting a second reference signal from the master device to the second recording device,
receiving a second response signal from the second recording device at the master device, and
determining the second data transmission delay based on a second period of time from transmitting the second reference signal until receiving the second response signal.

12. The method according to claim 11, wherein the second reference signal is a second digital signal that is transmitted over the second data transmission connection.

13. The method according to claim 11, wherein the second reference signal is a second acoustic signal, which is emitted by the loudspeaker of the master device, and the second response signal comprises a recording of the second acoustic signal.

14. A system for synchronously recording audio, the system comprising:
a first recording device,
a second recording device, and
a master device,
wherein the first recording device, the second recording device and the master device are configured to:
establish a first wireless data transmission connection between the master device and the first recording device,
establish a second wireless data transmission connection between the master device and the second recording device,
determine a first data transmission delay for the first data transmission connection,
determine a second data transmission delay for the second data transmission connection,
transmit predetermined reference data from the master device to the first recording device and to the second audio recording device,
play back the predetermined reference data and record first recording data at the first recording device, and
play back the predetermined reference data and record second recording data at the second recording device,
wherein during the transmission of the predetermined reference data a difference between the first data transmission delay and the second data transmission delay is taken into account in such a manner that the playing back of the predetermined reference data takes place synchronously at the first recording device and at the second recording device.

* * * * *